Oct. 9, 1934.    G. LE WITT    1,976,405
GOLF DRIVE INDICATOR
Filed Oct. 9, 1930
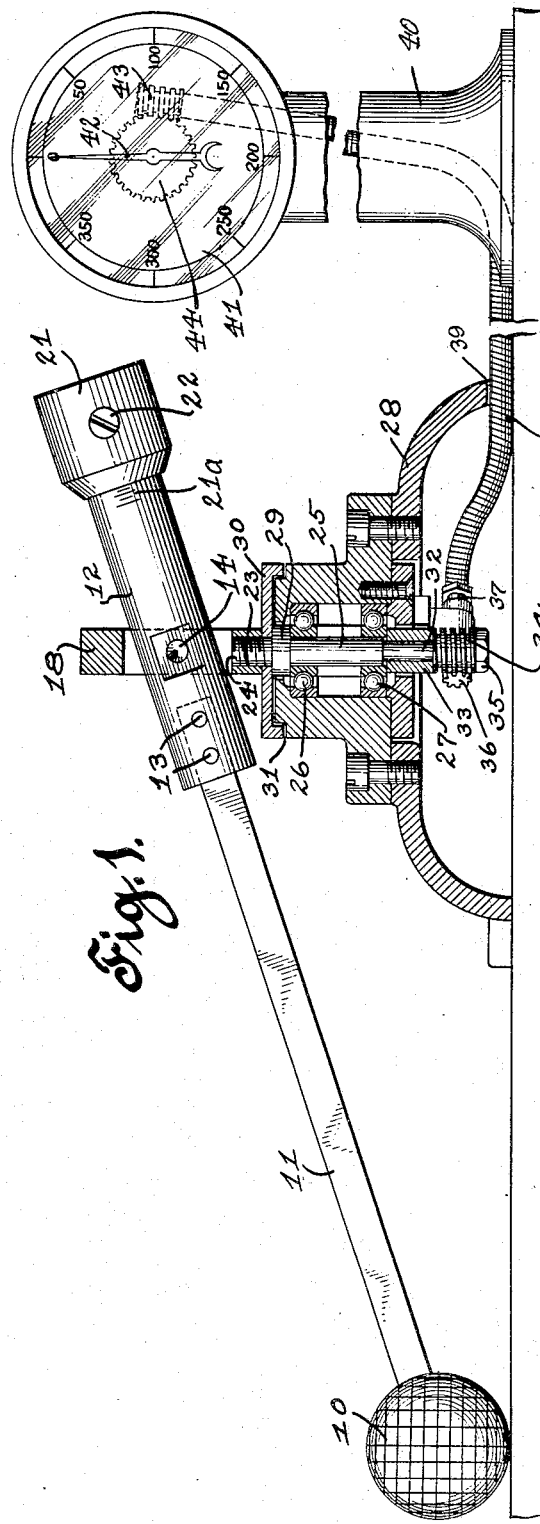
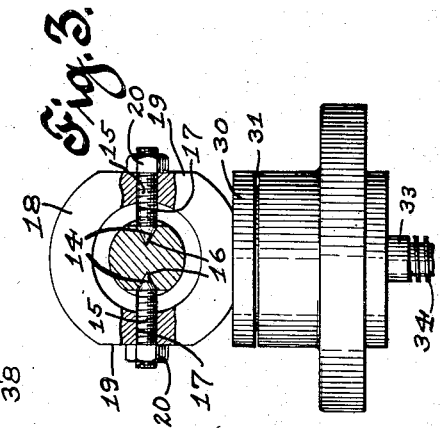
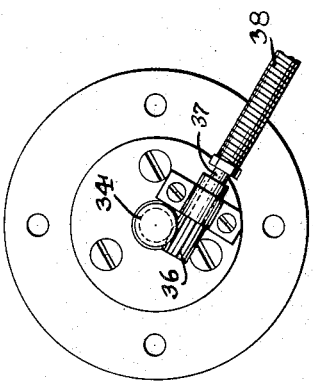
INVENTOR
George Le Witt
BY
H. G. Manning
ATTORNEY Patented Oct. 9, 1934

1,976,405

UNITED STATES PATENT OFFICE 1,976,405

GOLF DRIVE INDICATOR

George Le Witt, New Britain, Conn.

Application October 9, 1930, Serial No. 487,393

1 Claim. (Cl. 273—35)

This invention relates to games, and more particularly to a golf practice apparatus having a captive ball and an indicator for showing the length of the drive.

One object of the present invention is to provide a device of the above nature in which the captive golf ball is supported upon the end of a resilient rod whereby the shock of the stroke will be absorbed without injuring the indicating mechanism.

A further object is to provide a device of the above nature in which the ball-holding rod is mounted to swing vertically upon a horizontal pivot carried by a vertical shaft, the rotation of which is communicated through reduction gearing and a flexible shaft to the indicator.

A further object is to provide a ball-holding rod pivoted intermediate its ends upon said rotary shaft and having an adjustable counterweight movable on the end of said rod opposite from the ball.

It is a further object of the invention to provide a device of the above nature which will be simple in construction, inexpensive to manufacture, easy to install and manipulate, compact, ornamental in appearance, and very efficient and durable in use.

With these and other objects in view there has been illustrated on the accompanying drawing one form in which the invention may be conveniently embodied in practice.

In the drawing:

Fig. 1 represents a front view, partly in section and partly broken away, of the improved golf drive indicator.

Fig. 2 is a bottom view showing the connection between the rotating shaft and the flexible shaft connected with the indicator.

Fig. 3 is an end view of the upper portion of the shaft-supporting mechanism, showing the pivotal connection for the ball-holding rod.

Referring now to the drawing in which like reference numerals denote corresponding parts throughout the several views, the numeral 10 indicates a captive golf ball preferably of standard diameter and weight, said ball being supported upon the outer end of a flexible metallic rod 11 preferably formed of thin resilient steel. The rod 11 has its inner end located within a socket in a solid cylindrical body member 12, within which it is secured, as by rivets 13 passing transversely through said body member.

In order to permit the ball to rise above the ground and also rotate around a vertical axis, the body member 12 is provided adjacent its center with a pair of oppositely arranged alined conical sockets 14, adapted to form pivot bearings for a pair of horizontal screw members 15 having conical points 16 fitting within said sockets 14 (see Fig. 3). The screw members 15 are carried within a pair of threaded apertures 17 in a vertical substantially-circular yoke member 18, having flat vertical edges 19 against which a pair of locking nuts 20 mounted on said screw members 15 are adapted to engage. The end of the body member 12 opposite from the rod 11 is exteriorly threaded for receiving an adjustable hollow interiorly threaded counterweight 21 which is adapted to be held in any desired position, with reference to a scale 21a as by a set screw 22.

The circular yoke member 18 is provided at its lower end with a threaded socket 23 adapted to be tightly fitted upon the threaded upper end 24 of a vertical shaft 25 freely rotatable within two sets of ball-bearings 26 and 27 mounted in raceways carried within a hollow base member 28 resting upon the ground. Immediately below the threaded section 24 the shaft 25 is provided with a flange 29 which serves to support a cover member 30 screwed upon said threaded section 24 and having a depending flange on its periphery adapted to rotate within an annular groove 31 in the top of the base member 28. The lower end of the shaft 25 has a reduced section 32 journaled in a collar 33 and carrying on its lower end a worm 34 rigidly secured in position as by a bolt 35.

The rotation of the shaft 25 is transmitted from the worm 34 at a reduced speed to an elongated worm gear 36 carried on the end of a flexible shaft 37 encased in a flexible metal hose 38 passing out of the hollow base member 28 through an aperture 39. The metal hose 38 and the flexible shaft 37 pass up through a pedestal 40, at the top of which an indicator dial 41 and pointer 42 are provided. The upper end of the flexible shaft is provided with a worm 43 meshing with a gear 44 secured to the pointer shaft, a further reduction in the rotary speed being thereby obtained.

*Operation*

In the use of the apparatus, the golfer will swing his club against the captive ball 10 in the usual manner, causing it to rise from the ground around the horizontal axis of the screws 15 and to rotate freely upon the vertical shaft 25 until the momentum of the drive is dissipated. The length of the drive will then be indicated by the position of the pointer 42 on the dial 41.

It will be understood that the counter-weight 21 can be so adjusted that the ball 10 will rest upon the ground with its own weight thus duplicating actual conditions as nearly as possible. In the case of a "topped" drive, the ball will hop along the ground and lose headway by friction therewith, thus rapidly absorbing the energy of the ball exactly as if the shot had been made under natural conditions upon a golf course, and reducing the length of the flight in the same manner.

The indicator pointer may be reset to zero in any desired manner, as by mounting the pointer frictionally upon its shaft and providing a manually operated knob, not shown, for rotating the pointer to the zero point.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claim.

Having thus fully described the invention what is claimed as new and for which it is desired to secure Letters Patent is:

In a golf drive practice apparatus, a rod mounted to rotate on both vertical and horizontal axes, said rod having connected thereto a metal strip of thin rectangular cross-section carrying a ball on its outer end, said strip having its longest cross-sectional dimension in a vertical plane, so that it will be flexible only in lateral directions and will be inflexible vertically, and hence will prevent said rod from being set up into vertical swaying movements which would result in inaccuracy of the length of the practice drive indicated.

GEORGE LE WITT.